United States Patent
Nishiyama

(10) Patent No.: US 9,152,026 B2
(45) Date of Patent: Oct. 6, 2015

(54) DISCHARGE LAMP, LIGHT SOURCE DEVICE AND PROJECTOR

(75) Inventor: Yoshihide Nishiyama, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 824 days.

(21) Appl. No.: 13/351,694

(22) Filed: Jan. 17, 2012

(65) Prior Publication Data

US 2012/0194788 A1 Aug. 2, 2012

(30) Foreign Application Priority Data

Jan. 31, 2011 (JP) ................................. 2011-017638

(51) Int. Cl.
*H01J 17/16* (2012.01)
*H01J 61/35* (2006.01)
*G03B 21/20* (2006.01)
*H01J 61/04* (2006.01)
*H01J 61/82* (2006.01)

(52) U.S. Cl.
CPC ............ *G03B 21/2026* (2013.01); *H01J 61/045* (2013.01); *H01J 61/35* (2013.01); *H01J 61/827* (2013.01)

(58) Field of Classification Search
CPC ......... H01J 61/35; H01J 61/30; H01J 61/327; H01J 61/72; H01J 61/302; H01J 61/34; H01J 61/827; H01J 61/045; G03B 21/2026
USPC ...................... 313/634, 635, 489, 113; 353/98
See application file for complete search history.

(56) References Cited

U.S. PATENT DOCUMENTS

| 4,345,180 | A | 8/1982 | Schneider et al. |
| 4,360,546 | A | 11/1982 | Schneider et al. |
| 6,810,208 | B2 * | 10/2004 | Saiki et al. ................... 396/155 |
| 2006/0007677 | A1 * | 1/2006 | Israel et al. ................... 362/227 |
| 2007/0189016 | A1 | 8/2007 | Yamauchi et al. |
| 2007/0210714 | A1 | 9/2007 | Kijima |
| 2010/0213840 | A1 | 8/2010 | Nishiyama et al. |
| 2010/0213841 | A1 * | 8/2010 | Nishiyama et al. ........... 313/635 |

FOREIGN PATENT DOCUMENTS

| CN | 101021297 A | 8/2007 |
| JP | B2-03-07313 | 11/1991 |
| JP | A-06-333535 | 12/1994 |
| JP | B2-3467939 | 5/2003 |
| JP | A-2006-4704 | 1/2006 |
| JP | A-2007-250202 | 9/2007 |
| JP | A-2008-270074 | 11/2008 |
| JP | A-2010-009908 | 1/2010 |
| JP | A-2010-009909 | 1/2010 |

(Continued)

*Primary Examiner* — Thomas A Hollweg
*Assistant Examiner* — Kevin Quarterman
(74) *Attorney, Agent, or Firm* — Oliff PLC

(57) ABSTRACT

A discharge lamp includes a pair of electrodes for discharge and a discharge container having an inner space formed by quartz glass for separately placing the pair of electrodes and enclosing a discharge medium therein, a bulging part that surrounds the inner space, a pair of sealing parts that extend from ends of the bulging part and respectively support the pair of electrodes, an inner protective layer provided from a top portion opposed to a center of the pair of electrodes to a peripheral portion located at sides of the pair of sealing parts on an inner surface of the bulging part and having a thickness of the peripheral portion thinner than that of the top portion.

15 Claims, 10 Drawing Sheets

(56) References Cited

FOREIGN PATENT DOCUMENTS

| JP | A-2010-097702 | 4/2010 |
| JP | A-2010-198976 | 9/2010 |
| JP | A-2010-198977 | 9/2010 |
| JP | A-2011-096541 | 5/2011 |
| JP | A-2011-096578 | 5/2011 |
| JP | A-2011-096579 | 5/2011 |
| JP | A-2011-096580 | 5/2011 |

* cited by examiner

DISCHARGE LAMP, LIGHT SOURCE DEVICE AND PROJECTOR

CROSS-REFERENCE

The entire disclosure of Japanese Patent Application No. 2011-17638, filed Jan. 31, 2011 is expressly incorporated by reference herein.

BACKGROUND

1. Technical Field

The present invention relates to a discharge lamp having a discharge container made of quartz glass, and a light source device and a projector using the same.

2. Related Art

For a light source device used in a projector, for example, a discharge lamp such as an ultra-high pressure mercury lamp is mainly used. For a discharge container forming the discharge lamp, high-purity quartz glass is often used. The high-purity quartz glass has high viscosity and unyielding properties. Further, the high-purity quartz glass is hard to be crystallized even at a high temperature and may secure sufficient light transmissivity in a certain period as the discharge container.

However, there has been a problem that, even in the case of using quartz glass, for use in a long time and a long period, it is finally crystallized (devitrified). Further, there has been another problem that, with the use in a long time and a long period, an electrode made of tungsten becomes thinner.

In order to solve the problems, an attempt to suppress crystallization of silica glass has been made by forming a boron oxide film on an inner surface of the discharge container (Patent Document 1 (JP-A-2010-198977)). However, according to this method, crystallization of the quartz glass may be suppressed to some degree, but, for example, the thinning of the tungsten electrode may not necessarily be suppressed. Further, containers using a thin film of cubic boron nitride (c-BN), a thin film of silicon boron nitride (SiBN), a protective film of yttrium oxide, or the like have been known (Patent Document 2 (JP-A-6-333535), Patent Document 3 (JP-A-9-147801), and Patent Document 4 (JP-A-2008-270074)), however, in the cases, chemical vapor deposition (CVD) has been used for all of them, and it has been difficult to form them thicker on the inner surfaces of the discharge containers.

SUMMARY

An advantage of some aspects of the invention is to provide a discharge lamp that may greatly improve the lamp life by effectively reducing devitrification of a discharge container and suppressing thinning of an electrode, and a projector using the lamp.

An aspect of the invention is directed to a discharge lamp including a pair of electrodes for discharge, and a discharge container having an inner space formed by quartz glass for separately placing the pair of electrodes and enclosing a discharge medium therein, a bulging part that surrounds the inner space, a pair of sealing parts that extend from ends of the bulging part and respectively support the pair of electrodes, an inner protective layer provided from a top portion opposed to a center of the pair of electrodes to a peripheral portion located at sides of the pair of sealing parts on an inner surface of the bulging part and having a thickness of the peripheral portion thinner than that of the top portion. Here, the top portion refers to the entire of the most bulging part of the discharge container. For example, when the discharge container is a body of revolution around the center line passing through the pair of electrodes and the sides of the center between the pair of electrodes of the bulging part have the most bulging shape, the entire of the most bulging belt-like part is the top portion.

In the discharge lamp, on the inner surface of the bulging part, the inner protective layer in which the thickness of the peripheral portion is thinner than that of the top portion is provided, and thus, the top portion susceptible to the effect of discharge and devitrification are covered and sufficiently protected by the thicker part of the inner protective layer and devitrification is reduced. Further, the peripheral portion in which blackening as a factor of devitrification tends to occur are covered by the thinner parts of the inner protective layer and occurrence of blackening may be suppressed. By suppressing the occurrence of blackening as described above, accumulation of heat is prevented and devitrification may be further reduced. In this manner, occurrence of devitrification at the inner surface side may effectively be reduced. Further, since the inner protective layer is thinner in the peripheral portion as described above, deterioration of tungsten electrodes due to evaporation of boron, i.e., thinning of the electrodes may be suppressed compared to the case where the thickness is constant.

According to a specific embodiment of the invention, a thickness of the inner protective layer changes in a stepwise manner. In this case, for example, by stepwise deposition at plural times including deposition of partial regions, the inner protective layer having a thickness difference may be formed relatively easily.

According to another embodiment of the invention, the inner protective layer includes a thicker first protective film part, a thinner second protective film part, and a boundary part between the first protective part and the second protective part is formed in position corresponding to a constriction part formed as a joining part between end of the pair of sealing parts and end of the bulging part. In this case, of the inner surface of the bulging part, the section particularly susceptible to devitrification may be formed thicker.

According to still another embodiment of the invention, the inner protective layer is formed by application and melting of diboron trioxide on the inner surface of the bulging part. In this case, even when the inner surface of the bulging part is a curved surface like a spherical surface, for example, film formation may be performed in a desired thickness, and further, for example, film formation in the partial regions is performed relatively easily.

According to yet another embodiment of the invention, the inner protective layer includes a layer in which boron is diffused in the quartz glass. In this case, the diffusion layer is formed by Si—B—O based glass and has not only high light transmissivity but also very good chemical stability and heat resistance, and thus, the layer is hard to be changed in properties even when exposed to a high temperature in use of the lamp.

According to still yet another embodiment of the invention, a thickness of the inner protective layer is from 1 µm to 20 µm in the top portion and equal to or more than 0.1 µm and less than 1 µm in the peripheral portion at the sides of the pair of sealing parts. In this case, devitrification of the top portion may be sufficiently reduced and blackening in the peripheral portion may be suppressed.

Further another aspect of the invention is directed to a light source device including the above described discharge lamp, and a reflector that reflects luminous flux output from the discharge lamp. The light source device according to the aspect of the invention includes a light source lamp that can radiate luminous flux in a long term and has reliability.

Still further aspect of the invention is directed to a projector including the above described light source device, a light modulation device illuminated by illumination light from the light source device, and a projection lens that projects light modulated by the light modulation device. The projector according to the aspect of the invention includes a light source lamp that can radiate high-intensity illumination light in a long term and has high display quality and reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Light Source Device with Discharge Lamp Incorporated Therein

As below, a light source device in which a discharge lamp according to one embodiment of the invention is incorporated will be explained with reference to FIG. 1, etc.

Figure 1:
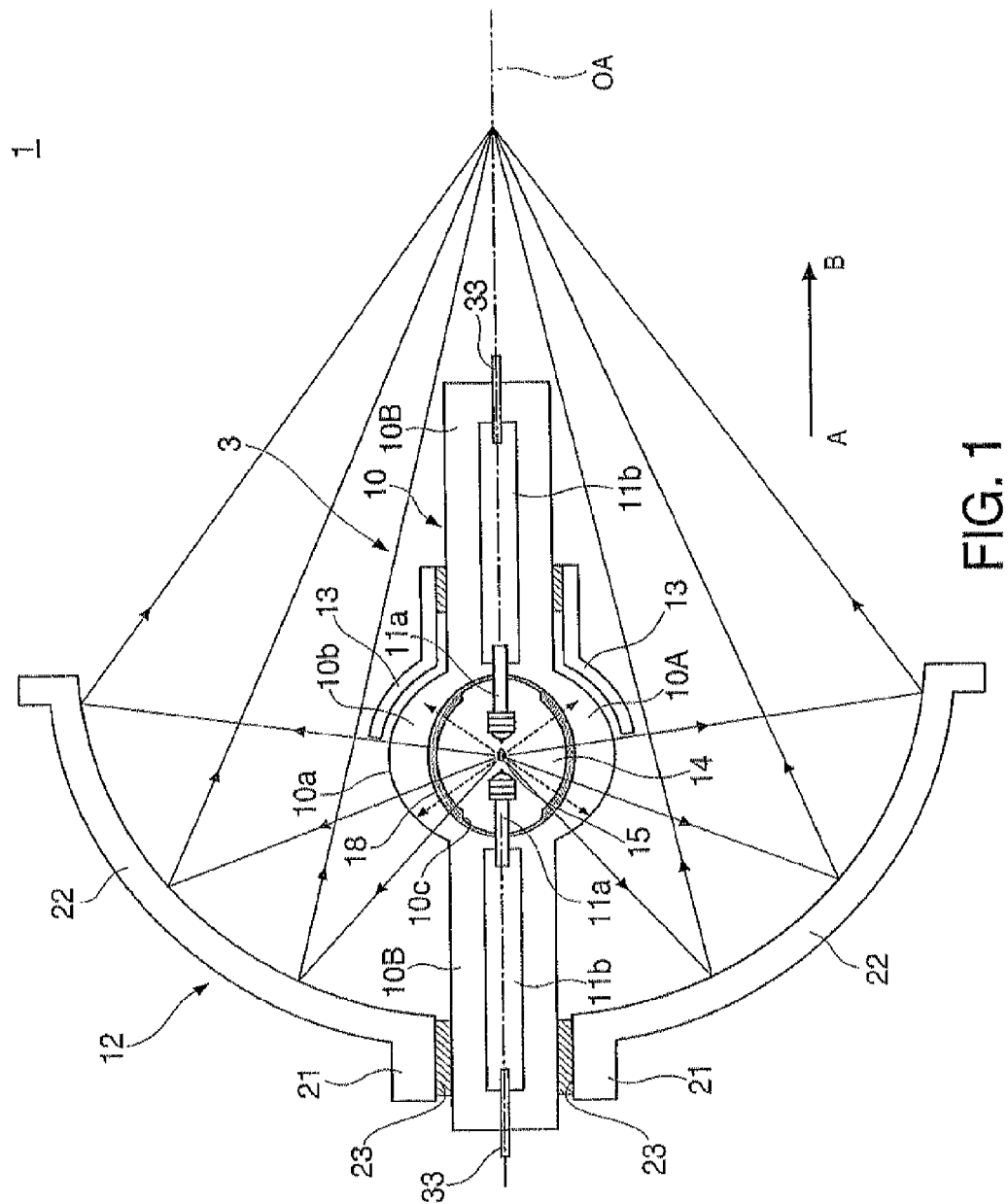
FIG. 1 is a sectional view showing a configuration of a light source device in which a discharge lamp of an embodiment is incorporated.

A light source device 1 shown in FIG. 1 includes a reflector 12, and a discharge lamp 3 provided inside of the reflector 12. The discharge lamp 3 has an arc tube 10 basically formed using quartz glass and a pair of electrodes 11a, 11a provided within the arc tube 10, and a discharge medium is enclosed within the arc tube 10.

Figure 2:
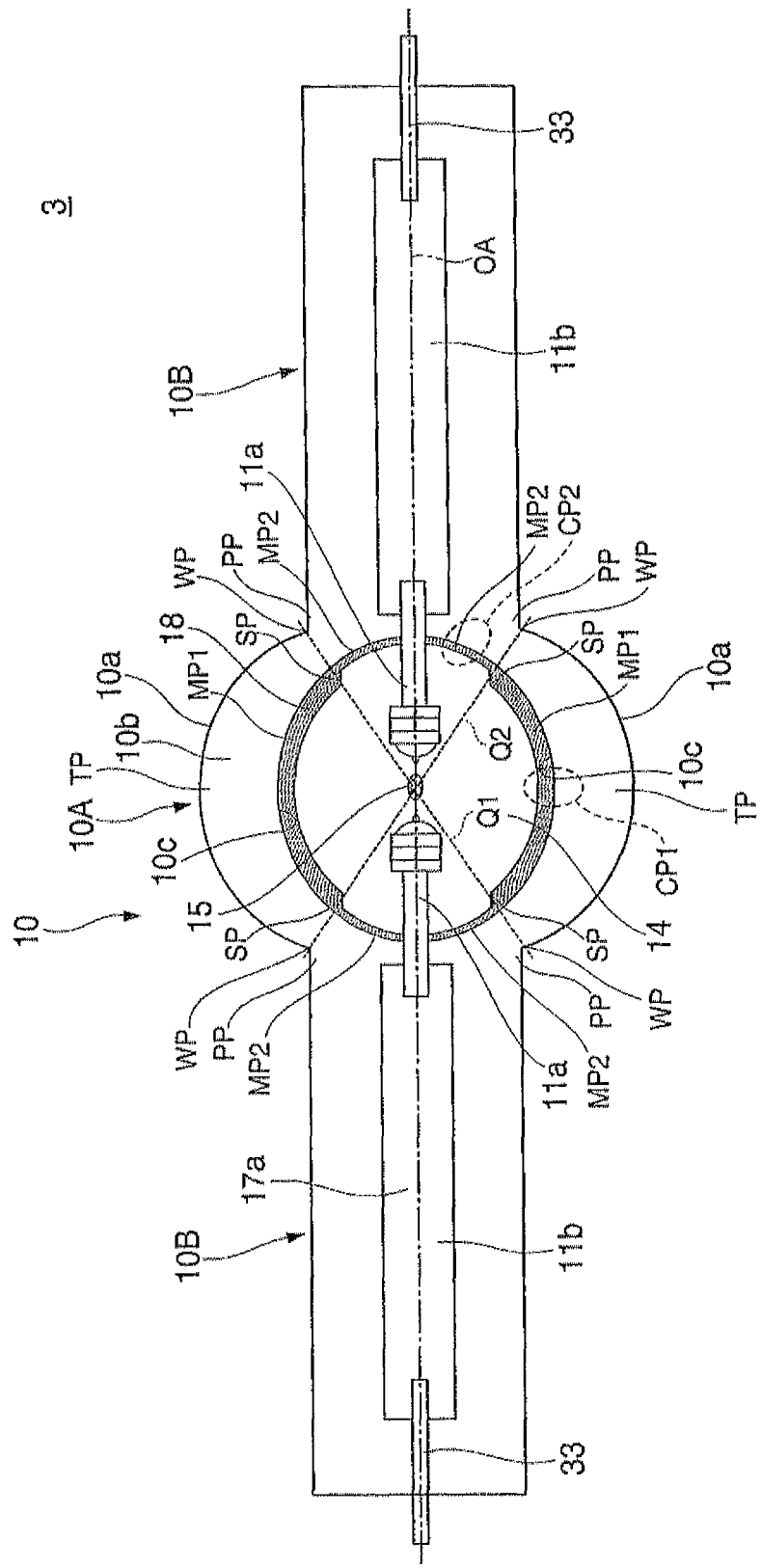
FIG. 2 is a sectional view showing a configuration of the discharge lamp of the embodiment.

As shown in FIG. 2, the arc tube 10 is a tubular discharge container formed by quartz glass, i.e., silica ($SiO_2$) glass and having light transmissivity. The arc tube 10 is a body of revolution around an optical axis OA as a center line passing through the pair of electrodes 11a, 11a, has a bulging part 10A that spherically bulges at its center and a pair of sealing parts 10B, 10B extending from both sides of the bulging part 10A, and an inner space 14 filled with the discharge medium is formed inside of the bulging part 10A sandwiched between the sealing parts 10B, 10B. The inner diameter of the inner space 14 is about one to several millimeters, for example.

Here, of the bulging part 10A having a shape of a body of revolution, the entire of the most bulging body part is referred to as "top portion TP", and the parts at the peripheral sides of the top portion TP, i.e., the parts at the sides of the pair of sealing parts 10B, 10B are referred to as "peripheral portions PP". In this case, the top portion TP is opposed to the light emission center at the side in directions perpendicular to the optical axis OA from the light emission center, i.e., the center of a light emission part 15 within the inner space 14. Therefore, the top portion TP is susceptible to the effect of the light radially output from the light emission center.

In the sealing parts 10B, 10B, the electrodes 11a, 11a having outer shapes extending in rod shapes with ends bulging into lumps are placed with their ends apart from each other. For the material of the electrodes 11a, 11a, a conducting material particularly having a small coefficient of thermal expansion and high heat resistance, and specifically, tungsten is suitable.

In the sealing parts 10B, 10B, metal foils 11b made of molybdenum electrically connected to the pair of electrodes 11a, 11a are inserted, and sealed using a glass material or the like. To the metal foils 11b, lead wires 33 as electrode lead wires are further connected, and the lead wires 33 extend to the outside of the discharge lamp 3 to be connectable to a power supply (not shown).

The discharge medium filling the inner space 14 may include not only a light emitting material such as mercury but also a rare gas, a halogen compound, etc. Here, it is desirable that the mercury is enclosed in an amount of enclosure of about 0.15 mg/mm$^3$ to 0.32 mg/mm$^3$ at vapor pressure of 150 bar to 190 bar, for example. Further, the rare gas is used for assisting light emission and, not limited, but argon gas, xenon gas, or the like may be used. Furthermore, the halogen is for prevention of blackening of the inner surface of the light bulb using the halogen cycle, and any one or more of chlorine, bromine, and iodine, and, particularly, bromine is preferably used.

As shown in FIG. 2, an inner protective layer 18 for improvement of durability of the discharge lamp 3 is formed on the inner surface 10c from the bulging part 10A at the center of the arc tube 10 as the discharge container to the sealing parts 10B, 10B. The inner protective layer 18 is formed so that the thickness of the peripheral portions PP may be thinner than the top portion TP from the top portion TP opposed to the light emission center between the pair of electrodes 11a, 11a of the bulging part 10A, i.e., the center of the light emission part 15 within the inner space 14 toward the peripheral portions PP located at the pair of sealing parts 10B, 10B.

Figure 3A:
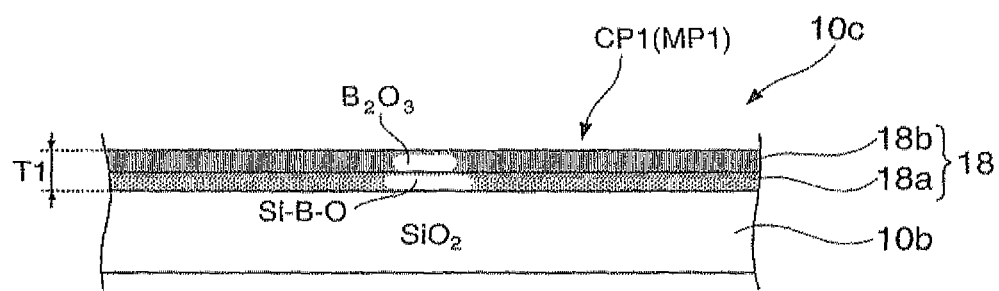
FIGS. 3A and 3B show inner surfaces of a bulging part near a top portion and a peripheral portion of the discharge lamp, respectively.

Further, the inner protective layer 18 is a skin layer containing boron oxide as shown in FIG. 3A, etc., for example, and has a diffusion layer 18a adjacent to a main body part 1ob formed by quartz glass and a covering layer 18b that covers the diffusion layer 18a. The diffusion layer 18a is formed by diffusing boron in the entire inner surface 10c of the arc tube 10, and a Si—B—O based glass material layer formed by adding $B_2O_3$ or the like to $SiO_2$. The diffusion layer 18a is formed to have a distribution in which the concentration of the boron is gradually smaller from the uppermost layer toward the inside (the depth part of the tube wall of the arc tube 10), and serves as a surface modification layer that covers the main body part 10b of the arc tube 10. The covering layer 18b is a film formed substantially using $B_2O_3$ and the $B_2O_3$ film covers the entire surface of the diffusion layer 18a.

Figure 3B:
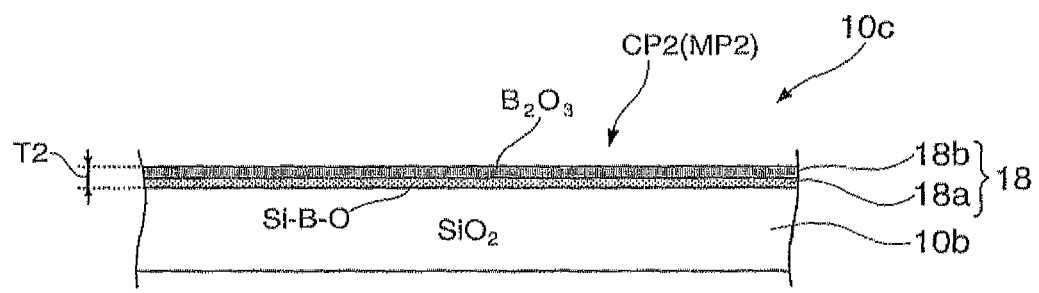

As below, the inner protective layer 18 will be explained more specifically. As shown in FIG. 2, the inner protective layer 18 has thicker first protective film parts MP1 covering the top portion TP side and thinner second protective film parts MP2 covering the peripheral portion PP sides. Thereby, the inner protective layer 18 has a structure in which the thickness is changed in a stepwise manner in two steps, and the thickness is thinner at the top portion TP than at the peripheral portions PP. That is, as schematically shown in FIGS. 3A and 3B, in comparison between a thickness T1 of a part CP1 contained in the first protective film part MP1 and a thickness T2 of a part CP2 contained in the second protective film part MP2, T1>T2. In this regard, the thickness T1 from 1 µm to 20 µm, specifically, equal to or less than 10 µm is desirable for sufficient reduction of devitrification in the top portion and avoidance of difficulty in fabrication. Further, the thickness T2 equal to or more than 0.1 µm and less than 1 µm is desirable for sufficient reduction of devitrification by suppression of blackening and prevention of thinning of the electrodes 11a, 11a. Note that, in this case, the thicknesses of the diffusion layer 18a and the covering layer 18b of the respective protective film parts MP1, MP2 are different in response to the difference between the thicknesses T1, T2 and have the same magnitude relation.

Further, as shown in FIG. 2, boundary parts SP between the first protective film part MP1 and the second protective film part MP2 are formed in positions corresponding to constriction parts WP as joining parts between the ends of the pair of sealing parts 103, 10B and the ends of the bulging part 10A. Specifically, in the drawing, the boundary parts SP are formed on dotted lines Q1, Q2 extending from the light emission center between the electrodes 11a, 11a, i.e., the center of the light emission part 15 within the inner space 14 toward the constriction parts WP.

As described above, in the arc tube 10, first, the top portion TP susceptible to the effect of discharge and devitrification are covered and protected by the thicker first protective film part MP1 of the inner protective layer 18. Thereby, devitrification in the bulging part 10A may be sufficiently reduced. Further, the peripheral portions PP in which blackening as a factor of devitrification tends to occur are covered by the thinner second protective film part MP2 of the inner protective layer 18. Thereby, the situation that devitrification is caused in the periphery of the blackened parts due to accumulation of heat by blackening and the devitrified part spreads because heat is more likely to accumulate and affects illumination light becomes avoidable. In this manner, occurrence of devitrification in the bulging part may be effectively reduced. Further, since the inner protective layer 18 on the peripheral portions PP is thinner, deterioration of the tungsten electrodes 11a, 11a, i.e., thinning of the electrodes 11a, 11a due to evaporation of boron may be suppressed compared to the case where the thickness is constant.

Returning to FIG. 1, the reflector 12 is an integrally-molded component made of glass including a neck-like part 21 in which the sealing part 10B of the discharge lamp 3 is inserted and a curved reflection part 22 spreading from the neck-like part 21. In the neck-like part 21, an insertion hole 23 is formed at the center, and one sealing part 108 of the discharge lamp 3 is provided and fixed to the center of the insertion hole 23. For fixing of the sealing part 10B, the one sealing part 10B is inserted into the insertion hole 23 of the reflector 12 and the gap inside the insertion hole 23 is filled with an inorganic adhesive consisting primarily of silica, alumina, etc. Thereby, the discharge lamp 3 is reliably fixed to the reflector 12. The reflection part 22 of the reflector 12 is formed by evaporation of an inorganic material film, a metal thin film, or the like on the curved glass inner surface, and the reflection surface of the reflection part 22 is a cold mirror that reflects visible light and transmits an infrared ray, for example.

The discharge lamp 3 is provided inside of the reflection part 22 so that the light emission center between the electrodes 11a, 11a supported within the bulging part 10A, i.e., the center of the light emission part 15 within the inner space 14 may coincide with the focal position of the curved mirror of the reflection part 22. When the discharge lamp 3 is turned on, the luminous flux radiated from the bulging part 10A is reflected on the reflection surface of the reflection part 22 toward the luminous flux output direction AB side.

A sub-reflector 13 is a reflection member that covers the luminous flux output direction AB side of the bulging part 10A, and its reflection surface is formed in a concave curved surface conforming with the inner surface 10c of the bulging part 10A (i.e., the spherical surface defining the inner space 14) and the outer surface 10a of the bulging part 10A. The reflection surface of the sub-reflector 13 is a cold mirror like that of the reflector 12.

In the above described discharge lamp 3, when a voltage is applied between the pair of lead wires 33 extending from the pair of sealing parts 10B to the outside, discharge occurs between the electrodes 11a, 11a and the light emission part 15 emits light. Then, part of the luminous flux output forward from the bulging part 10A of the discharge lamp 3 is reflected on the reflection surface of the sub-reflector 13 and returned into the bulging part 10A again. Then, part of the return light is absorbed by the discharge medium enclosed in the inner space 14 of the bulging part 10A, and the other return light travels toward the reflector 12 side and is reflected on the reflection part 22 of the reflector 12 and output in the direction of the luminous flux output direction AB as a whole.

The above described light source device 1 includes the discharge lamp 3 having the arc tube (discharge container) 10 covered by the inner protective layer 18 and may reduce devitrification of the arc tube 10 in the long term and suppress the deterioration of thinning of the electrodes 11a, 11a, and thus, the lamp life may be significantly improved.

Manufacturing Method of Discharge Lamp

In the following description, a step of forming the inner protective layer 18 on the inner surface 10c of the arc tube 10 of the discharge lamp 3 as one of characteristic parts of the invention will be explained in detail and the explanation of other steps will be omitted or simplified.

Figure 4:
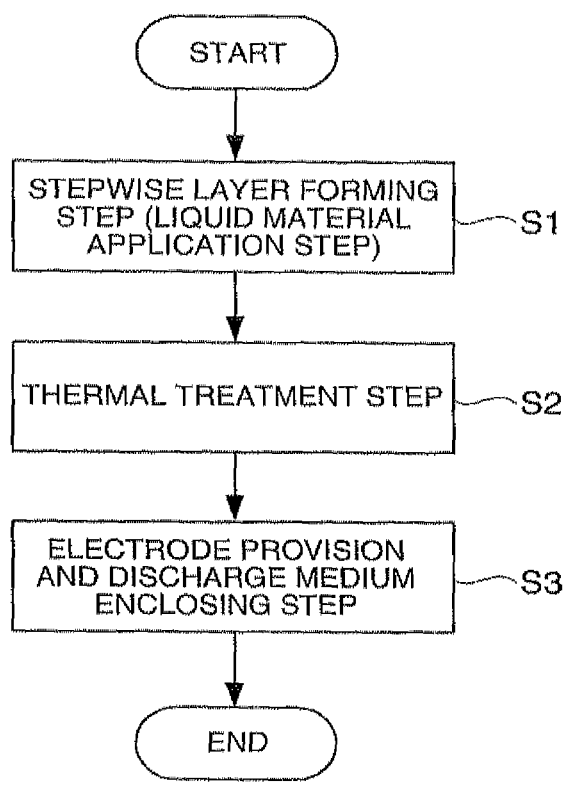
FIG. 4 is a flowchart showing a manufacturing process of the discharge lamp.
Figure 5A:
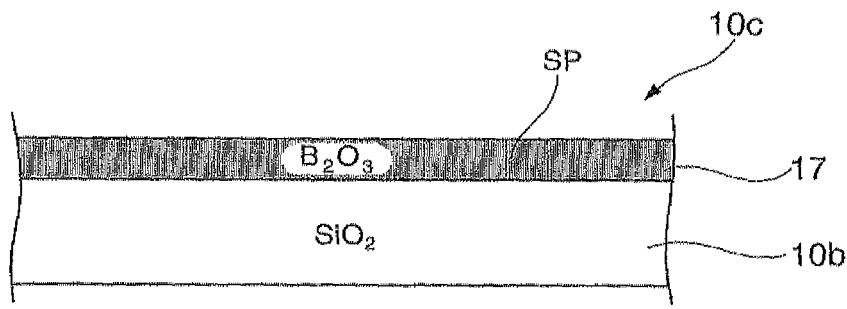
FIGS. 5A and 5B show partially enlarged sectional views of an arc tube in the middle of the manufacturing process of the discharge lamp.
Figure 5B:
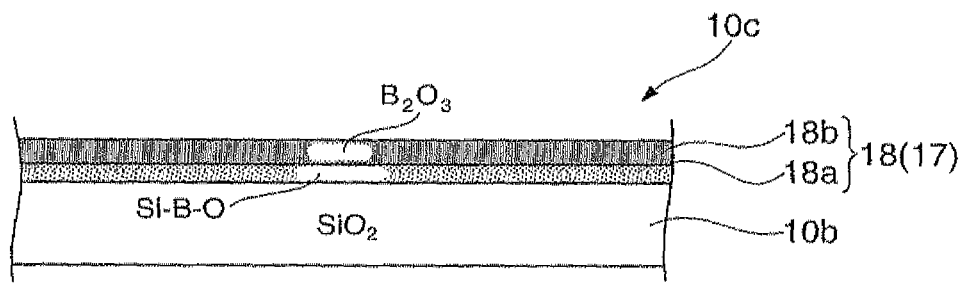

FIG. 4 is a flowchart showing a manufacturing process of the discharge lamp 3, and FIGS. 5A and 5B show partially enlarged sectional views of the arc tube 10 during formation of the inner surface 10c.

As shown in FIG. 4, the manufacturing method of the discharge lamp 3 has a stepwise layer forming step (step S1), a thermal treatment step (step S2), and an electrode provision and discharge medium enclosing step (step S3). Here, the stepwise layer forming step at step S1 includes plural liquid material application steps of applying liquid materials.

First, a quarts glass tube to be the main body part 10b of the arc tube 10 is prepared. This quarts glass tube has a larger inner diameter in the center part corresponding to the bulging part 10A and smaller sectional areas at ends corresponding to the sealing parts 10B, 10B.

As shown in FIG. 5A, a liquid material farmed by solving diboron trioxide ($B_2O_3$) with a solvent is applied to the inner surface 10c of the arc tube 10, and the applied liquid material is dried to form an applied film (a solidified fine particle layer 17 of boron oxide) (step S1). Note that, in this regard, application and drying are divisionally performed at plural times while applied regions are changed, and thus, a thickness difference may be provided in the solidified fine particle layer 17 and the boundary parts SP (see FIG. 2) may be formed at completion. That is, for example, in the first application, application and drying of the liquid material are performed partially only in the location where the first protective film parts MP1 of the inner surface 10c are formed, and, in the second application, application and drying of the liquid material are performed in the location corresponding to the entire inner surface 10c. Thereby, the solidified fine particle layer 17 may have two-step thicknesses.

Next, regarding the solidified fine particle layer 17 formed at step S1, the arc tube 10 is heated and burnt within a furnace, and the solidified fine particle layer 17 of boron oxide is melted and, as shown in FIG. 5B, boron is diffused in the tube wall of the inner surface 10c of the arc tube 10 (step S2). The boron is diffused in the quartz glass ($SiO_2$) forming the arc tube 10, and thereby, the diffusion layer 18a is formed and the inner surface 10c (the uppermost layer of the tube wall) is modified. Here, by heating the solidified fine particle layer 17, boron is gradually diffused from the uppermost layer of the inner surface 10 in contact with the solidified fine particle layer 17 of boron oxide toward the deeper part. Accordingly, there is a distribution in which the concentration of boron is higher at the uppermost layer side and gradually lower toward the thickness direction of the tube wall. In this manner, the diffusion layer 18a having a concentration gradient at which the concentration of boron is gradually lower from the uppermost layer of the inner surface 10c toward the deeper part in the thickness direction of the tube wall is formed to cover the main body part 10b on the underneath main body part 10b as a modifying layer. Further, at the same time with the formation of the diffusion layer 18a, the covering layer 18b formed by the glassy $B_2O_3$ film is left on the diffusion layer 18a.

The electrodes 11a, 11a are provided in the arc tube 10 that has been fabricated at step S2 and mercury and a halogen gas are enclosed therein (step S3). Thereby, the discharge lamp 3 is completed. The discharge lamp 3 is used as a component part for assembly of the light source device 1 as shown in FIG. 1. That is, the sub-reflector 13 and the reflector 12 are fixed to the discharge lamp 3, and the light source device 1 is obtained.

Figure 6A:
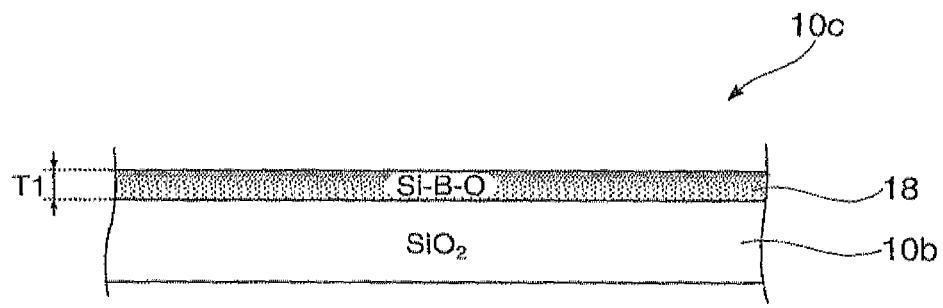
FIGS. 6A and 6B show modified examples.
Figure 6B:
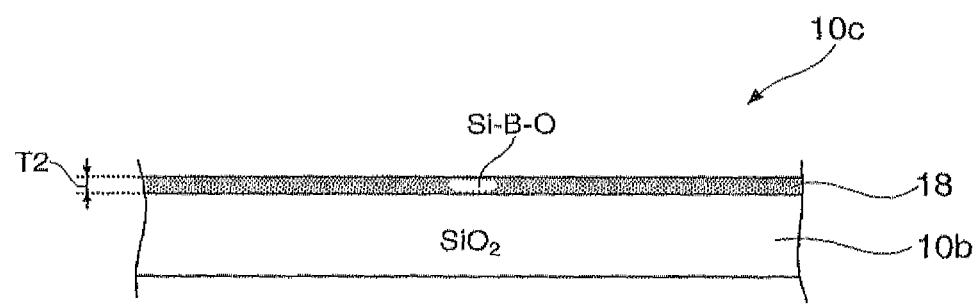

Note that, as shown in FIGS. 6A and 6B, the covering layer 18b may be omitted in the inner protective layer 18. That is, for example, at step S2, the left covering layer 18b may be removed by etching or the like, and the inner protective layer 18 may be formed only by the diffusion layer 18a. Thereby, evaporation of boron in the inner space may be further suppressed.

Working Example

Figure 7C:
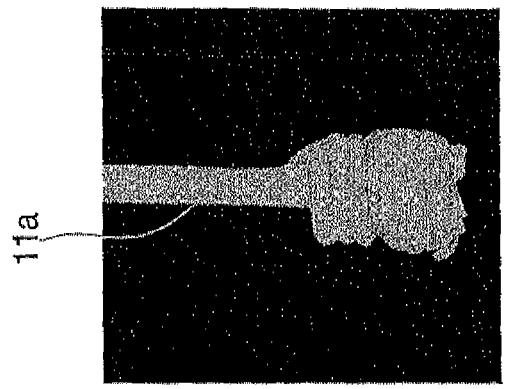
FIGS. 7A to 7C show states of changes of an electrode with passage of discharge time.
Figure 7B:
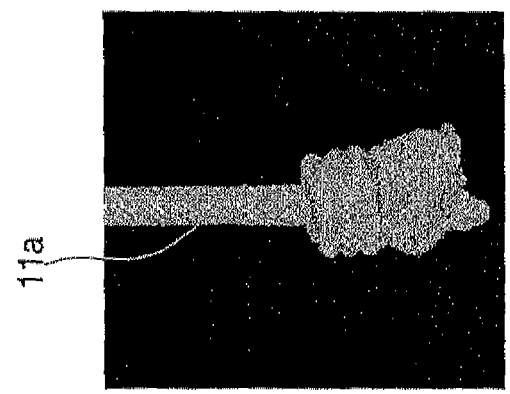
Figure 7A:
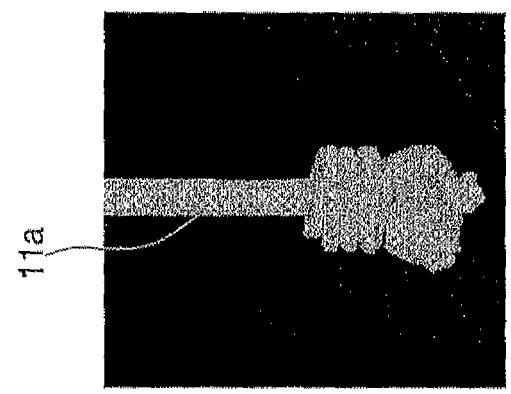
Figure 8A:
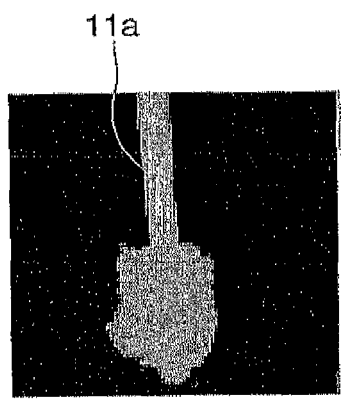
FIGS. 8A to 8I show states of changes of an electrode with passage of discharge time regarding discharge lamps of comparative examples.
Figure 8B:
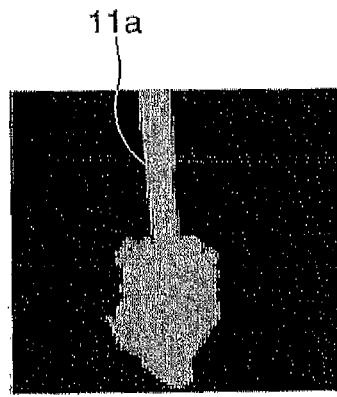
Figure 8C:
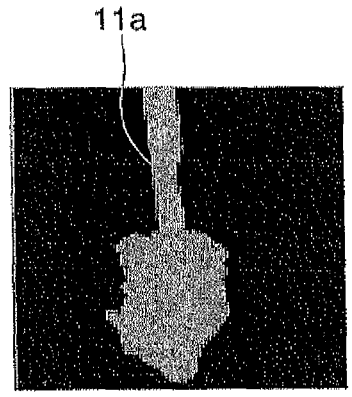
Figure 8D:
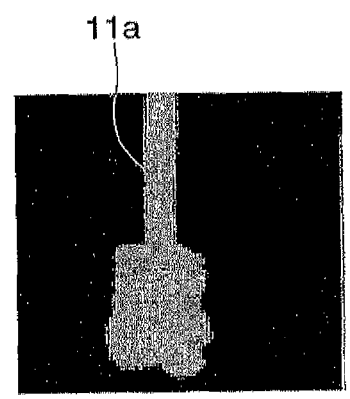
Figure 8E:
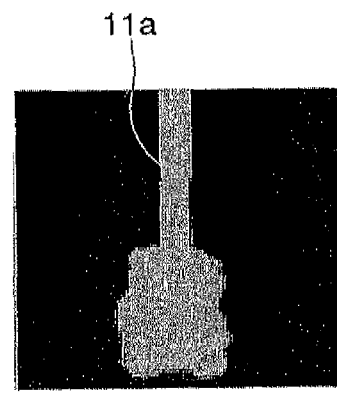
Figure 8F:
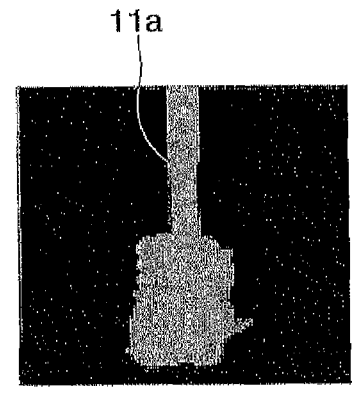
Figure 8G:
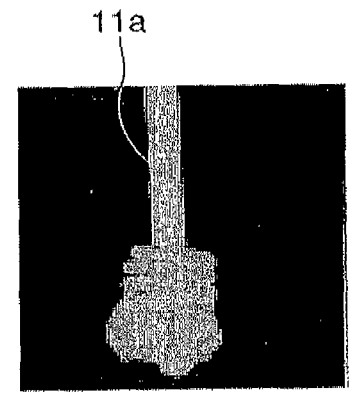
Figure 8H:
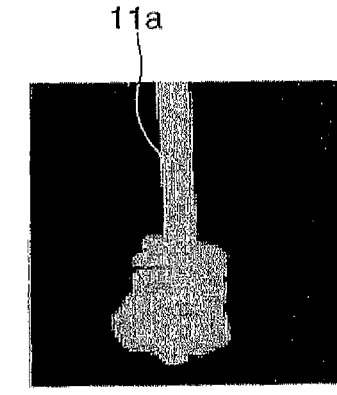
Figure 8I:
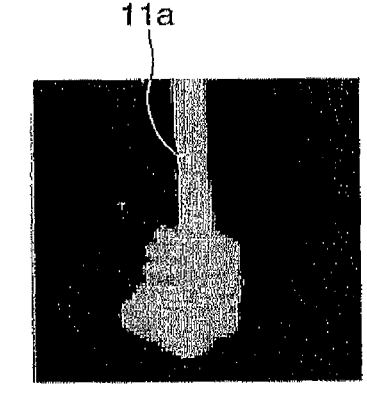

FIGS. 7A to 7C show states of changes of the electrode 11a with use of the discharge lamp 3. Specifically, FIG. 7A shows the shape of the electrode 11a after 307 hours from the start of use, FIG. 7B shows the shape after 539 hours from the start of use, and FIG. 7C shows the shape of the electrode 11a after 800 hours from the start of use. As shown in the pictures, in this case, slight deterioration is seen at the end of the electrode 11a, however, the axial side is kept to be thicker. On the other hand, in all of comparative examples shown in FIGS. 8A to 8I, the electrodes 11a are severely deteriorated. Specifically, FIG. 8A to 8C show changes of the electrode 11a when the inner protective layer 18 is formed in a uniform thick film with no thickness difference in the discharge lamp 3. FIG. 8A to 8C show the electrode 11a after 261 hours, 450 hours, and 739 hours from the start of use, respectively. Similarly, FIG. 8D to 8F show changes of the electrode 11a when the inner protective layer 18 is formed in a uniform thin film with no thickness difference in the discharge lamp 3. FIG. 8D to 8F show the electrode 11a after 261 hours, 450 hours, and 739 hours from the start of use, respectively. Further, FIG. 8G to 8I show changes of the electrode 11a when no inner protective layer 18 is provided in the discharge lamp 3. FIG. 8G to 8I show the electrode 11a after 261 hours, 450 hours, and 739 hours from the start of use, respectively. In the case of FIGS. 8A to 8F, the axial side is particularly thinner. Further, in the case of FIGS. 8G to 8I, the shape of the end side is severely lost. In comparison, it is known that the deterioration of the electrode 11a is suppressed in the embodiment.

Figure 9A:
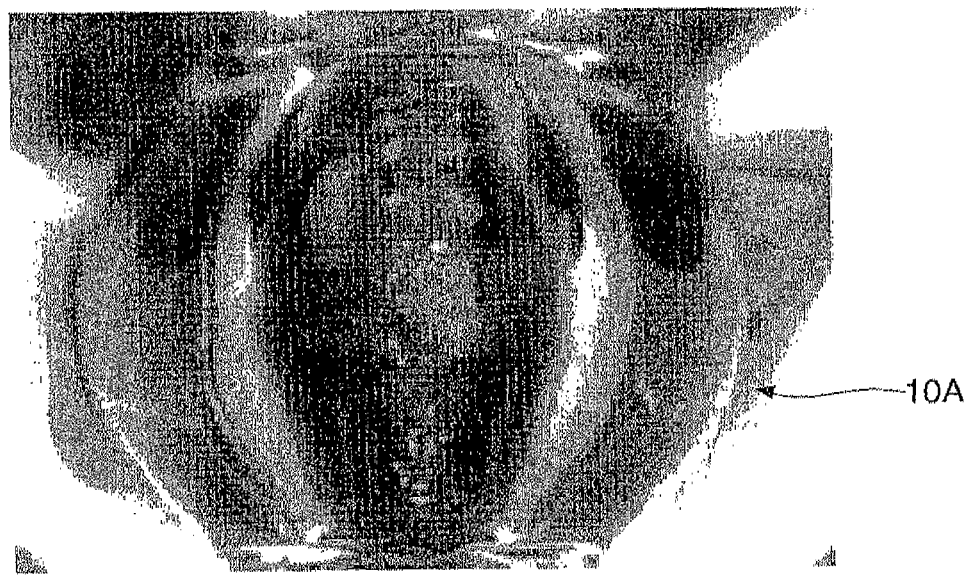
FIG. 9A shows a state of a discharge container of a discharge lamp of a working example.
Figure 9B:
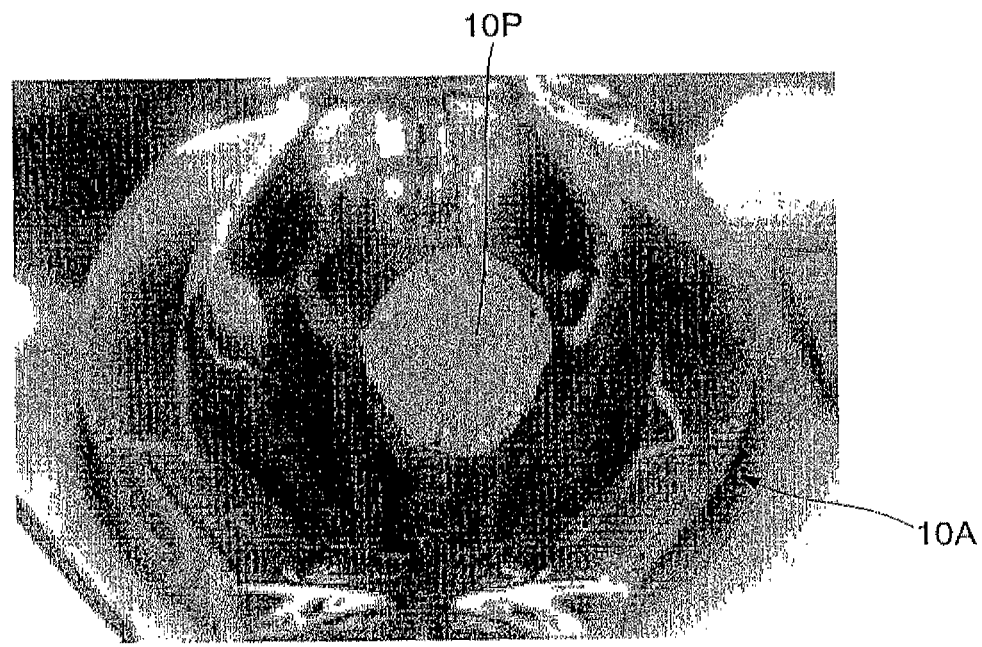
FIG. 9B shows a state of a discharge container of a discharge lamp of a comparative example.

Further, FIG. 9A shows a change of the bulging part 10A of the arc tube 10 with use of the discharge lamp 3. Specifically, it shows the shape of the bulging part 10A after 750 hours from the start of use of the discharge lamp 3. In this case, devitrification hardly occurs on the inner surface of the bulging part 10A. On the other hand, FIG. 9B shows a change of the bulging part 10A of the arc tube 10 with use of the discharge lamp 3 when no inner protective layer 18 is provided as a comparative example, and shows the shape of the bulging part 10A after 750 hours from the start of use. In this case, a part 10P of the bulging part 10A is devitrified as shown in the picture.

Projector

Next, a projector using the discharge lamp of the embodiment will be explained.

Figure 10:
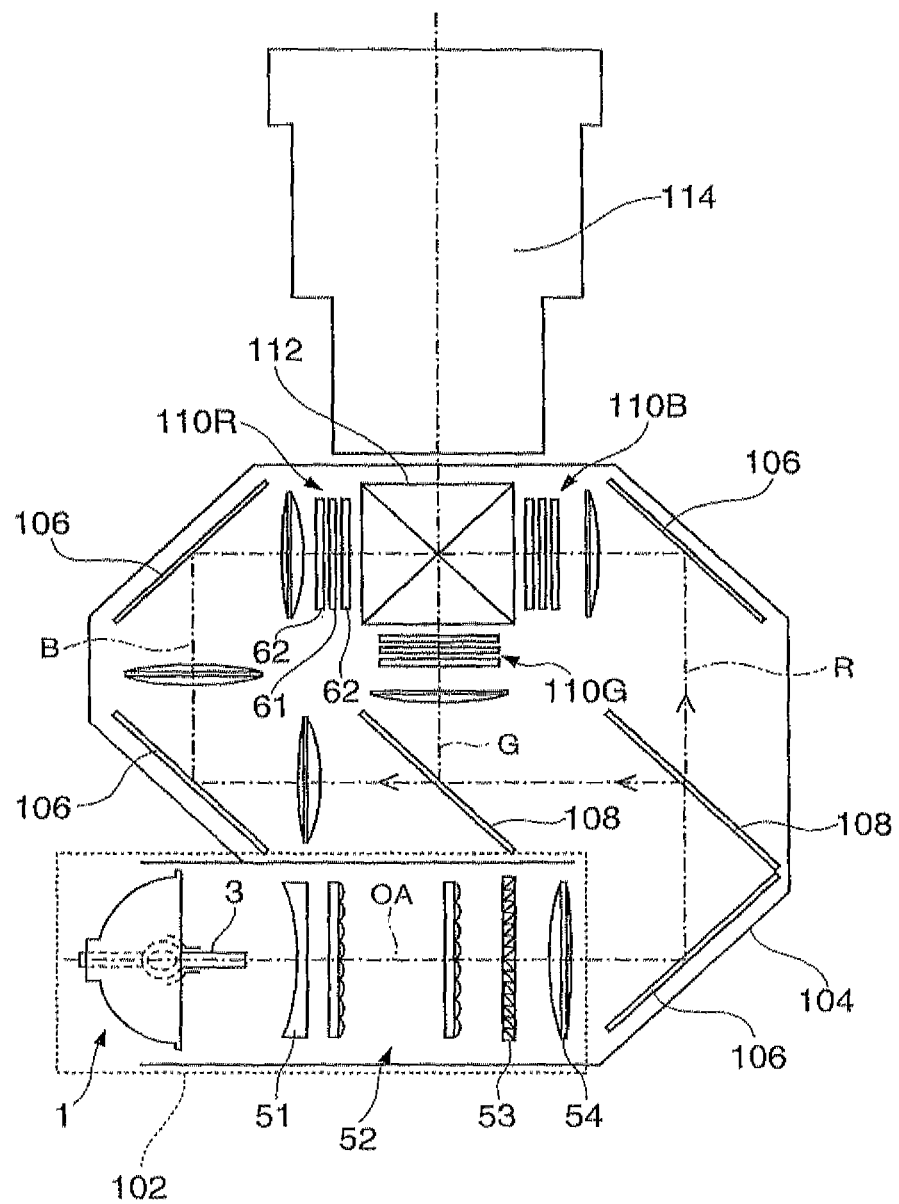
FIG. 10 is a schematic configuration diagram of a projector.

FIG. 10 is a plan view showing a configuration example of a projector. Inside of the illustrated projector 100, a lamp unit 102 having the light source device 1 shown in FIG. 1 is provided as an illumination system. The lamp unit 102 includes a collimator lens 51 that parallelizes luminous fluxes, an integrator 52 that uniformizes the luminous fluxes, a polarization conversion device 53 that aligns the polarization directions of the luminous fluxes, a superimposing lens 54 that superimposes the luminous fluxes, etc. in addition to the light source device 1.

The projection light output from the lamp unit 102 is separated into three primary colors of RGB by four mirrors 106 and two dichroic mirrors 108 provided within a light guide 104, and allowed to enter liquid crystal panels (light modulation units) 110R, 110B, 110G as light valves corresponding to the respective primary colors.

The respective liquid crystal panels 110R, 110B, 110G are light modulation devices each having a structure in which a liquid crystal element 61 as an active element for light modulation is provided between a pair of polarizing films 62, 62, and driven by primary color signals of R, G, B supplied from an image signal processing circuit (not shown), respectively. Then, the lights modulated by the liquid crystal panels 110R, 110B, 110G are allowed to enter the dichroic prism 112 from three directions. In the dichroic prism 112, the R and B lights are refracted to 90 degrees and the G light travels straight. Accordingly, images of the respective colors are combined, and thus, a color image is projected on a screen or the like via a projection lens 114. Here, regarding display images by the liquid crystal panels 110R, 110B, 110G, the displayed image by the liquid crystal panel 110G is necessary to be horizontally reversed with respect to the displayed images by the liquid crystal panels 110R, 110B.

The projector 100 has the discharge lamp 3 shown in FIG. 1 in the lamp unit 102. In the discharge lamp 3, devitrification may be suppressed in a long term and thinning of electrodes may be suppressed. Accordingly, the projector 100 may have a longer life and projected images with high display quality and high reliability may be obtained. Further, the small discharge lamp 3 and thus the light source device 1 are provided, and the projector downsized and light-weighted as a whole may be obtained.

Others

The invention has been explained according to the respective embodiments, however, the invention is not limited to the above described embodiments, but may be implemented in various forms without departing from the scope thereof and, for example, the following changes may be made.

In the above description, in the arc tube 10, the inner protective layer 18 has had the two-step thickness difference and formed so that the thickness is thinner from the top portion TP toward the peripheral portions PP, however, not limited to that, the layer may have multistep thickness differences. Further, not the multistep thickness differences, the thickness may gradually change.

Further, in the arc tube 10, regarding the inner protective layer 18, the first protective film parts MP1 have been formed in the shape of a body of revolution to cover the entire top portion TP with the thicker first protective film part MP1, however, for example, in the case where only the upper surface sides of the top portion TP at the opposite side to the direction of gravitational force in consideration of usage are more susceptible to devitrification, only the upper surface side of the top portion TP may be covered by the first protective film part MP1 and the side surface and lower surface side of the top portion TP may be covered by the thinner second protective film part MP2.

Furthermore, an outer protective layer may be formed on the outer surface 10a from the bulging part 10A to the sealing parts 10B, 10B of the arc tube 10 for improvement of the strength of the arc tube 10.

Moreover, another element may be contained in the $B_2O_3$ for forming the inner protective layer 18 of the discharge lamp 3 unless suppression of breakage and suppression of devitrification of the discharge container as advantages of the invention are lost.

In addition, the projector 100 in the embodiment has used the liquid crystal panels 110R, 110B, 110G as light modulation units. However, the light modulation units are not limited to those, but, generally, any one that modulates incident light in response to image information may be used, and a micromirror light modulation device or the like may be used. As the micromirror light modulation device, for example, a DMD (digital micromirror device) (registered trademark) may be used. In the case where the micromirror light modulation device is used, light incident-side polarizers, light exiting-side polarizers, etc. are not necessary or a polarization conversion element is not necessary.

The light source device 1 having the discharge lamp 3 incorporated therein has been used for the transmissive-type liquid crystal projector 100 as an example. However, the light source device 1 has the same advantages not limited for use in the transmissive-type liquid crystal system but in a projector employing an LCOS (Liquid Crystal On Silicon) system or the like as a reflective-type liquid crystal system.

As the light modulation units of the projector 100, the three-LCD system using three liquid crystal panels, or a single-LCD system using one liquid crystal panel may be used. Note that, in the case of using the single-LCD system, a color separation system, a light combining system, etc. of an illumination system may be unnecessary.

Further, the light source device 1 having the discharge lamp 3 incorporated therein has been applied to the front-type projector that projects an optical image on a projection surface provided outside. However, not limited to that, the device may be applied to a rear-type projector that has a screen inside of the projector and projects an optical image on the screen.

Furthermore, the light source device I having the discharge lamp 3 incorporated therein may be applied not only limited to the light source of the projector, but to other optical equipment as a small and light-weight light source device. In addition, the light source device 1 may be preferably applied to illumination equipment of airplanes, ships, vehicles, etc. and to indoor illumination equipment.

What is claimed is:

1. A discharge lamp comprising:
a pair of electrodes for discharge; and
a discharge container having an inner space formed by quartz glass for separately placing the pair of electrodes and enclosing a discharge medium therein, a bulging part that surrounds the inner space, a pair of sealing parts that extend from ends of the bulging part and respectively support the pair of electrodes, and an inner protective layer provided from a top portion opposed to a center of the pair of electrodes to a peripheral portion located at sides of the pair of sealing parts on an inner surface of the bulging part and having a thickness of the peripheral portion thinner than that of the top portion,
wherein a thickness of the inner protective layer is from 1 μm to 20 μm in the top portion and equal to or more than 0.1 μm and less than 1 μm in the peripheral portion at the sides of the pair of sealing parts.

2. The discharge lamp according to claim 1, wherein the inner protective layer is formed by application and melting of diboron trioxide on the inner surface of the bulging part.

3. The discharge lamp according to claim 1, wherein the inner protective layer includes a diffusion layer in which boron is diffused in the quartz glass.

4. The discharge lamp according to claim 3, wherein the diffusion layer is formed to have a distribution in which concentration of boron is gradually lower from an uppermost layer toward inside.

5. The discharge lamp according to claim 3, wherein an entire surface of the diffusion layer is covered by a covering layer substantially formed by diboron trioxide.

6. A light source device comprising:
the discharge lamp according to claim 1; and
a reflector that reflects luminous flux output from the discharge lamp.

7. The discharge lamp according to claim 1, wherein a thickness of the inner protective layer changes in a stepwise manner.

8. The discharge lamp according to claim 7, wherein the inner protective layer includes a thicker first protective film part, a thinner second protective film part, and a boundary part between the first protective film part and the second protective film part, the boundary part is formed in positions corresponding to a constriction part formed as a joining part between end of the pair of sealing parts and end of the bulging part.

9. A projector comprising:
a light source device including
a discharge lamp having a pair of electrodes for discharge, and a discharge container having an inner space formed by quartz glass for separately placing the pair of electrodes and enclosing a discharge medium therein, a bulging part that surrounds the inner space, a pair of sealing parts that extend from ends of the bulging part and respectively support the pair of electrodes, and an inner protective layer provided from a top portion opposed to a center of the pair of electrodes to a peripheral portion located at sides of the pair of sealing parts on an inner surface of the bulging part and having a thickness of the peripheral portion thinner than that of the top portion, and a reflector that reflects luminous flux output from the discharge lamp;

a light modulation device illuminated by illumination light from the light source device; and a projection lens that projects light modulated by the light modulation device, wherein a thickness of the inner protective layer is from 1 µm to 20 µm in the top portion and equal to or more than 0.1 µm and less than 1 µm in the peripheral portion at the sides of the pair of sealing parts.

10. The projector according to claim 9, wherein the inner protective layer is formed by application and melting of diboron trioxide on the inner surface of the bulging part.

11. The projector according to claim 9, wherein the inner protective layer includes a diffusion layer in which boron is diffused in the quartz glass.

12. The projector according to claim 11, wherein the diffusion layer is formed to have a distribution in which concentration of boron is gradually lower from an uppermost layer toward inside.

13. The projector according to claim 11, wherein an entire surface of the diffusion layer is covered by a covering layer substantially formed by diboron trioxide.

14. The projector according to claim 9, wherein a thickness of the inner protective layer changes in a stepwise manner.

15. The projector according to claim 14, wherein, the inner protective layer includes a thicker first protective film part, a thinner second protective film part, and a boundary part between the first protective film part and the second protective film part, the boundary part is formed in positions corresponding to constriction parts formed as a joining part between end of the pair of sealing parts and end of the bulging part.

* * * * *